United States Patent
Graham et al.

(10) Patent No.: US 10,127,760 B2
(45) Date of Patent: Nov. 13, 2018

(54) SYSTEMS AND METHODS FOR DYNAMIC SHARDING

(71) Applicant: GAMESYS LTD, London (GB)

(72) Inventors: Phillip Jarlath Graham, London (GB); Andrew Firth, Seattle, WA (US); Joshua Richard Watkins, London (GB)

(73) Assignee: Gamesys Ltd., London (GB)

( * ) Notice: Subject to any disclaimer, the term of this patent is extended or adjusted under 35 U.S.C. 154(b) by 342 days.

(21) Appl. No.: 14/775,771

(22) PCT Filed: Mar. 13, 2014

(86) PCT No.: PCT/US2014/025672
§ 371 (c)(1),
(2) Date: Sep. 14, 2015

(87) PCT Pub. No.: WO2014/160029
PCT Pub. Date: Oct. 2, 2014

(65) Prior Publication Data
US 2016/0019745 A1  Jan. 21, 2016

Related U.S. Application Data

(60) Provisional application No. 61/907,384, filed on Nov. 21, 2013, provisional application No. 61/785,643, filed on Mar. 14, 2013.

(51) Int. Cl.
*G07F 17/32* (2006.01)
*A63F 13/358* (2014.01)
(Continued)

(52) U.S. Cl.
CPC .......... *G07F 17/3211* (2013.01); *A63F 13/32* (2014.09); *A63F 13/352* (2014.09);
(Continued)

(58) Field of Classification Search
CPC .................... G07F 17/3223; G07F 17/3234
See application file for complete search history.

(56) References Cited

U.S. PATENT DOCUMENTS 5,991,808 A * 11/1999 Broder .................... G06F 9/505
                                                                 709/203
7,695,370 B2 * 4/2010 Liu ............................ A63F 13/12
                                                                   463/40

(Continued)

OTHER PUBLICATIONS

"Database Sharding: The Key to Database Scalability" by Cory Isaacson, Aug 14, 2009. Source: http://www.dbta.com/Editorial/Trends-and-Applications/Database-Sharding--The-Key-to-Database-Scalability-55615.aspx.*

(Continued)

*Primary Examiner* — Steven J Hylinski
(74) *Attorney, Agent, or Firm* — Fincham Downs, LLC; Carson C. K. Fincham

(57) ABSTRACT

Systems, methods, and articles of manufacture provide for dynamic sharding, such as in an online gaming environment. The invention includes providing a shared data store including at least a table store adapted to store data representative of table state; creating a plurality of shards wherein each shard includes at least a floor manager system and a game system; presenting a plurality of tables to players via a lobby interface; and scaling a number of the plurality of shards to support a current number of players. Numerous additional aspects are disclosed.

10 Claims, 6 Drawing Sheets

(51) Int. Cl.
*A63F 13/79* (2014.01)
*A63F 13/352* (2014.01)
*A63F 13/71* (2014.01)
*A63F 13/32* (2014.01)
*G06F 17/30* (2006.01)

(52) U.S. Cl.
CPC ............ *A63F 13/358* (2014.09); *A63F 13/71* (2014.09); *A63F 13/79* (2014.09); *G06F 17/30575* (2013.01); *G07F 17/3223* (2013.01); *G07F 17/3234* (2013.01); *G07F 17/3276* (2013.01)

(56) References Cited

U.S. PATENT DOCUMENTS

| | | | | |
|---|---|---|---|---|
| 2002/0147042 | A1* | 10/2002 | Vuong | G07F 1/06 463/40 |
| 2003/0070178 | A1* | 4/2003 | Boyd | G07F 17/32 725/110 |
| 2005/0240935 | A1* | 10/2005 | Ramanathan | G06F 9/505 718/105 |
| 2006/0025221 | A1* | 2/2006 | Jain | G07F 17/32 463/42 |
| 2006/0287097 | A1* | 12/2006 | Moshal | G07F 17/32 463/42 |
| 2007/0178955 | A1* | 8/2007 | Mills | A61F 1/00 463/13 |
| 2007/0184902 | A1* | 8/2007 | Liu | A63F 13/12 463/42 |
| 2011/0288907 | A1* | 11/2011 | Harvey | G06Q 10/0639 705/7.29 |
| 2012/0142429 | A1 | 6/2012 | Muller | |
| 2012/0149474 | A1 | 6/2012 | Bickley | |
| 2012/0290714 | A1* | 11/2012 | Cohen | G06F 11/00 709/224 |
| 2013/0109480 | A1* | 5/2013 | Yuan | G07F 17/3225 463/42 |
| 2013/0123018 | A1* | 5/2013 | Sareli | G07F 17/3223 463/42 |
| 2014/0228108 | A1* | 8/2014 | Bruno, Jr. | G06F 12/00 463/29 |
| 2015/0089523 | A1* | 3/2015 | Volovich | H04N 21/23103 725/14 |

OTHER PUBLICATIONS

Written Opinion for PCT/US14/025672 dated Aug. 11, 2014; 4 pps.
International Search Report for PCT/US14/025672 dated Aug. 11, 2014; 6 pps.
International Preliminary Report on Patentability for PCT/US14/025672 dated Aug. 11, 2014; 5 pps.

* cited by examiner

SYSTEMS AND METHODS FOR DYNAMIC SHARDING

CROSS-REFERENCE TO RELATED APPLICATIONS

This application is a National stage filing of and claims benefit and priority to International Application No. PCT/US14/025672 filed on Mar. 13, 2014 and titled "SYSTEMS AND METHODS FOR DYNAMIC SHARDING", which itself claims benefit and priority to: (i) U.S. Provisional Patent Application No. 61/907,384 filed on Nov. 21, 2013 and titled "SYSTEMS AND METHODS FOR DYNAMIC SHARDING" and (ii) U.S. Provisional Patent Application No. 61/785,643 filed on Mar. 14, 2013 and titled "SYSTEMS AND METHODS FOR DYNAMIC SHARDING", the entirety of each of which is hereby incorporated by reference herein

FIELD OF THE INVENTION

At least some embodiments described herein relate to sharding in distributed computing systems, and particularly to methods and systems for dynamic sharding of such systems.

BACKGROUND

Database systems and applications implemented using data structures with large data sets and high throughput applications can challenge the capacity of a single server. High query rates can exhaust the processor capacity of the server. Larger data sets can exceed the storage capacity of a single machine. Finally, working set sizes larger than the system's memory stress the input/output (I/O) capacity of disk drives. To address these issues of scale, two basic approaches have been developed: vertical scaling and sharding.

Vertical scaling adds more CPU and storage resources to increase capacity. However, scaling by adding capacity has limitations: high performance systems with large numbers of CPUs and large amount of RAM are disproportionately more expensive than smaller systems. Additionally, cloud-based providers may only allow users to provision smaller instances. As a result there is a practical maximum capability for vertical scaling.

In contrast, sharding, or horizontal scaling, divides the data set and distributes the data over multiple servers, or shards. Each shard includes an independent database, and collectively, the shards include a single logical database. Sharding addresses the challenge of scaling to support high throughput and large data sets. In a simple example, each of several shards can be implemented on a separate instance of a server with each server running on a separate virtual machine. Sharding reduces the number of operations each server handles. Each shard processes fewer operations as the cluster of servers grows. As a result, shared clusters can increase capacity and throughput horizontally. For example, to store data, an application only needs to access the shard responsible for the relevant records. Sharding also reduces the amount of data that each server needs to store. Each shard stores less data as the cluster grows. For example, if an application has a one terabyte data set, and there are four shards, then each shard might hold only 256 GB of data. If there are 40 shards, then each shard might hold only 25 GB of data.

Sharding can also be used to add fault tolerance to a system by segregating traffic to one or more duplicates of the system. Sharding a single instance/server is relatively simple because doing so only requires replicating the system and introducing some routing of traffic. In highly distributed systems however, the present inventors have observed that significant complexities arise because of the implicit and explicit relationships between communicating systems and, with respect to online gaming, the complex game/business logic the systems may maintain.

The present inventors have also observed that sharding approaches are historically reactive rather than proactive. Modern distributed, highly concurrent systems are typically required to be built to function in an environment where the systems are in a constant state of failure. Further, systems that provide online gaming, which is becoming more regulated, have the additional requirement of being able to operate with constraints on where the systems are deployed. Thus, what is need are systems, methods, and apparatus that provide an efficient and cost effective solution to these (and other) problems.

SUMMARY

In some embodiments, the present invention provides methods of using dynamic sharding for online gaming systems. Embodiments of the methods include providing a shared data store including at least a table store adapted to store data representative of table state; creating a plurality of shards wherein each shard includes at least a floor manager system and a game system; presenting a plurality of tables to players via a lobby interface; and scaling a number of the plurality of shards to support a current number of players.

In other embodiments, the present invention provides systems for using dynamic sharding in online gaming systems. Embodiments of the systems include a plurality of data centers, each data center including one or more servers operatively coupled to each other data center; a shared data store including at least a table store adapted to store data representative of table state and distributed among the plurality of data centers; and a plurality of shards wherein each shard includes at least a floor manager system and a game system and wherein the plurality of shards are distributed among the plurality of data centers, wherein the floor manager system is adapted to add and remove shards in response to player demand.

In yet other embodiments, the present invention provides other systems for using dynamic sharding in online gaming systems. Embodiments of the other systems include a plurality of processors; and a memory associated with each processor operative to store instructions executable on the processors, the instructions being adapted to provide a shared data store including at least a table store adapted to store data representative of table state; create a plurality of shards wherein each shard includes at least a floor manager system and a game system; present a plurality of tables to players via a lobby interface; and scale a number of the plurality of shards to support a current number of players.

Numerous additional aspects are provided in accordance with these and other embodiments of the invention. Other features and aspects of embodiments of the present invention will become more fully apparent from the following detailed description, the appended claims, and the accompanying drawings.

DETAILED DESCRIPTION OF EXAMPLE EMBODIMENTS

Figure 1:
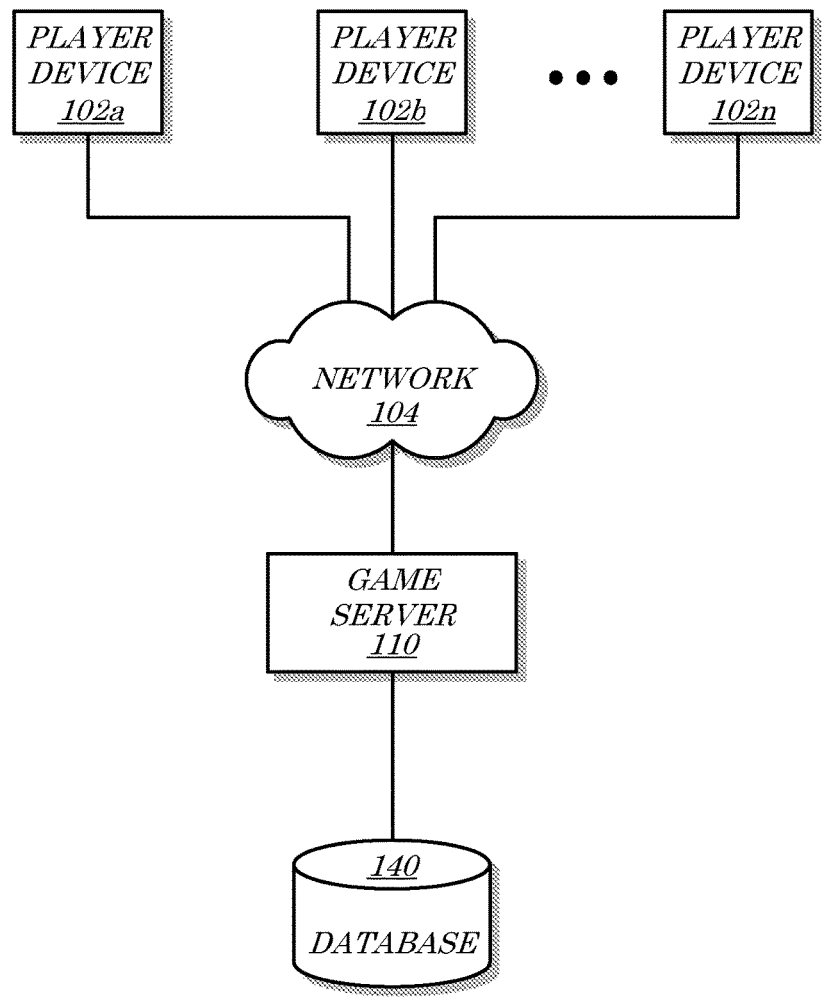
FIG. 1 is a schematic diagram of an embodiment of a distributed computing system in accordance with one or more embodiments described herein.

Embodiments presented herein are descriptive of systems, apparatus, methods, and articles of manufacture for implementing dynamic sharding. The ability to distribute players in a multiplayer game across different servers/instances can allow for greater scaling, availability/resilience and logical separation of concerns. Existing products such as messaging and data store systems enable such distribution. If there are two systems, A and B which together function to provide a game, multiple instances of A and B may be added to scale to more players and to provide failover (e.g., if one instance of A fails there is still another instance running). This approach is referred to herein as "standard scaling."

The ideal for standard scaling is that as more instances are added to the system, the system's capabilities scale linearly. If a single instance of a system A supports one hundred (100) players then two instances of the system AA would ideally support two hundred (200) players and four instances of the system AAAA would ideally support four hundred (400) players. Although the enabling technologies often claim such linear scaling, the reality is that the ideal is not achieved particularly when the systems are combined with other different systems and when infrastructure limitations and complex game logic are taken into consideration. In fact, adding replica instances to a complex system (e.g., one that includes seven or more systems like A, B, C, D, E, F, G) is not straight forward since an additional instance of system A could potentially undesirably impact any of the other systems B, C, D, E, F, G. Simply adding an entire additional set of all the systems A, B, C, D, E, F, G may not be an efficient solution either. Generally one may experience diminishing returns in scaling system this way beyond a certain factor. This is referred to herein as the 'Diminishing Returns Problem'.

Having multiple instances of the same system does give one greater availability and resilience within the physical location the instances are hosted. While it is unlikely that a hosting center will become unavailable, it is however possible and does happen. For example, Amazon® Web Services™, a commercial hosted services provider, recognizes this possibility with the concept of "Availability Regions." Availability Regions are not guaranteed to be available one hundred percent (100%) of the time. It is up to the system software (e.g., the game system) to manage availability across regions to insure maximum availability of the system. Likewise, a system that is implemented across a plurality of geographically diverse private datacenters manages system availability across the different datacenters to insure maximum availability of the system instead of relying on the individual datacenters to be 100% available. Therefore, a system that implements a game ideally ensures that the system remains available even if one or more of the Availability Regions or datacenters running the system becomes unavailable. This is referred to herein as the 'Availability across Regions Problem'.

Due to legal regulations and/or restrictions, gaming servers may be required to be hosted in a datacenter located in a specific geographic region. Regulators can 'ring-fence' players so that the players are only permitted to play games hosted in the players' regulated datacenters. However, because such requirements can be limiting for smaller states, in some cases, such states may open up to pooling players from other regulated states. This may happen continuously, temporally and/or within some other constraints. This means that players from different jurisdictions may, for example, play on games run in a different jurisdiction—but under some control. The game may, for example, play within the rules of the jurisdiction it is being run/hosted in. The need for great flexibility and dynamism in such a case will be referred to as the 'Pooling Liquidity across Borders Problem'.

In order to operate a scalable and available platform in a world of diverse regulatory bodies and locations, Applicants realize that solutions are needed for many attendant problems such as (but not limited to) the Diminishing Returns Problem; Availability across Regions Problem; and/or Pooling Liquidity across Borders Problem.

To illustrate some embodiments of the present invention, assume that AAA, BBB, CC, DDD describes a distributed gaming system with three (3) instances of sub-systems A, B and D and two (2) instances of sub-system C. Because of the Diminishing Returns Problem one may not be able to scale this system efficiently any further than the three instances of A, B and D and two instances of C. Such a system may support, for example, ten thousand (10k) concurrent players (e.g., online poker players), across one thousand (1,000) tables. Adding more of any of the sub-systems may not be cost effective since just doubling the number of each sub-system may only result in a ten percent (10%) improvement (e.g., one thousand one hundred (1,100) tables). Adding a complete separated duplicate system (e.g., AAA, BBB, CC, DDD+AAA, BBB, CC, DDD) will allow another ten thousand (10k) concurrent players, but even with a single-sign-on solution, the tables in each system would effectively be isolated from each other such that each system would have their own Lobby listing available tables and games exclusive of the tables and games of the other, for example.

Prior art systems such a Zynga® Poker provided by Zynga Inc. of San Francisco, Calif., uses this isolated, complete system replication method (e.g., AAA, BBB, CC, DDD+AAA, BBB, CC, DDD) where players are required to select an isolated 'casino' when they first launch the application. In other words, Zynga players are required to select a shard and then are limited to playing with only people on that shard. Zynga Poker for the iPad® automatically picks a shard for the player and the presence of other shards is hidden from the player. Thus, once a shard is selected/assigned, Zynga players are then limited to playing on a relatively small number of tables within the selected casino. Two players logging into the Zynga system, even from the same geographic area, may not see the same tables, much less be able to enter the same casino or play together. Thus, players do not feel as though they are experiencing play in a large casino where they can play with any other player. As of 2013, Zynga casinos support less than ten thousand (<10k) concurrent players each and all the casinos together support less than about four hundred thousand (>400k) concurrent players.

According to some embodiments of the present invention, a system can be provided to allow many concurrent players and to allow the players to experience the feeling that they are in one big casino (e.g., a virtual casino) where they can see all their friends and play on any table. Prior art systems such as Zynga Poker clearly do provide such an experience and the scaling methods used by such system are not optimal to achieve such a result. In contrast to prior art systems and in accordance with embodiments of the present invention, players never know they are playing on a sharded system and can move between shards seamlessly. For example, if a player moves to table four (4) from table one thousand (1000) in the system of the present invention, the player has no idea that the player may be moving from a game hosted in a datacenter in Florida to a game hosted in a data center in California. The player can play with all the player's friends no matter on which shard the player or the friends resides. While in some embodiments, a small performance cost may be paid for dynamic sharding when a table is created/added, there is no extra performance cost when players select a table in the Lobby.

Accordingly, the inventors of the present invention use dynamic sharding to overcome the limitations of the prior art. To illustrate embodiments of the present invention, assume that the poker table is an atomic granule, i.e., a table resides within a single distributed poker system (e.g., AAA, BBB, CC, DDD) and represents the smallest organizational grouping of players. Such a single distributed poker system that includes multiple tables can be called a 'floor'. Each floor can include a finite number of tables. Multiple floors can be arranged into a 'hotel'. A hotel can include a 'Floor Manager' that stores a 'Floor Plan' of the entire hotel. The Floor Plan specifies which tables are on which floors. Tables are assigned unique identifiers, e.g., from a sequence of identifiers, such that the Floor Manager can easily track which table is on which floor and quickly find the floor of any table even if the Floor Plan holds millions of tables. Further, since tables can be grouped by their unique identifier, the Floor Manger can manage any realistically sized Floor Plan which scales linearly. Thus, the Floor Manager ensures that the Lobby of the hotel knows on which floor each and every table resides. Since the Lobby advertises current and future games to players, the Lobby or the Floor Manager can efficiently and transparently transport players to the relevant floor once the players select or are assigned to a table. Thus players do not have to be aware of shards and do not perceive any restrictions that they are limited to playing within one shard.

Dynamic sharding in accordance with embodiments of the present invention is elastic. In a dynamic sharding system implementing a virtual world, hotel floors can be dynamically added, removed, combined, and/or re-sized. The Floor Manager simply changes the Floor Plan and communicates those changes to the Lobby. Since the functions of the Floor Manager are relatively simple compared to other parts of the system such as the game itself, the amount of data that represents the Floor Plan is relatively compact and in some embodiments, the Lobby may be implemented simply as a cache of links to tables. Embodiments of the present invention enable these player-grouping management components to be implemented to scale in a linear fashion and to allow for linearly scaling of the more complex games system. Thus, scaling out to accommodate massive numbers of concurrent players using finite hardware resources is enabled by dynamically growing and shrinking the hotel in real time, e.g., in response to current or anticipate demand. This scaling elasticity allows for the most efficient use of infrastructure as the scaling can be a function of the provisioning of virtual machine instances. Thus, the present invention allows floors to be added/removed and tables to be moved between the floors in real time, reacting to live demand and allowing the use of servers in a more cost effective way.

Further, the example organization to support this dynamic sharding, as described above, is not necessarily limited to a single hotel. Shards sharing a Floor Plan across datacenters allows tables to be hosted in different datacenters. The Floor Plan model is ideal for this because (i) it is compact, (ii) its rate of change is low, and (iii) it is only accessed by the Floor Manager. This means changes can be communicated between datacenters quickly with minimal latency and the Floor Plan can be cached if needed. Since a Floor Manager within a shard can be embodied simply as functions or logic that runs against the shared Floor Plan, there can be as many instances of Floor Managers as are needed. To avoid locking contention, in some embodiments, Floor Managers may be assigned responsibility for managing only the tables that reside in the datacenter in which each corresponding Floor Manager resides.

Further, dynamic sharding as embodied in the present invention can be leveraged to enable a system without a single point of failure unlike most prior art systems that have at least a single point of failure at the datacenter level. Shared Floor Plans and Lobbies allow for the spreading of tables across many regions but still provides players with the perception that all of the tables and games are being hosted in a single place. This organization allows for the spreading of risk across regions which addresses the 'Availability across Regions Problem' discussed above. In some embodiments, the removal of a datacenter (e.g., as a result of a power outage at the data center) used in the system, will result in only the tables hosted at that datacenter becoming unavailable. Further, Floor Manager systems can be adapted to include additional functions/logic to provide, for example, fault tolerance. For example, the Floor Manager systems can be adapted to re-assemble tables from one failed datacenter in another. Re-assembling tables can be achieved by table state replication between datacenters. Such replication can be implemented within a system wide data store or database. After a data center becomes unavailable, a Floor Manager at a functioning datacenter simply takes control of the portion of the floor plan belonging to the failed datacenter and creates the associated floors locally.

Thus, Floor Managers can be implemented as lightweight programs but can include additional capabilities to provide additional functionality such as, for example, automatic failover in response to datacenter failures and predictive expansion in readiness for scheduled tournaments (e.g., the Floor Manager can create floors based on a schedule (or a scheduled event) and anticipated/historical player participation).

Regulation may dictate that datacenters have to be located in certain geographic regions so that games play out within certain state borders. Since the financial viability of multiplayer games are tied to having a critical mass of players (i.e., liquidity), it is possible that smaller states will, in accordance with some embodiments, pool their liquidity. This pooling may come with regulatory constraints and due to the nature of online gaming, new regulations will be introduced and existing regulation changed. Thus, having a flexible approach to the location of game hosting is desirable to accommodate changing geographical requirements. Embodiments of dynamic sharding therefore provide a mechanism to address the 'Pooling Liquidity across Borders Problem' mentioned above since cooperating states can have their own hotels/datacenters and allow a managed movement of liquidity between the hotels/datacenters. For example, embodiments of the present invention can easily accommodate a 'Super Sunday Tournament' where neighboring states allow their players to play together in the same tournament at a certain time on a Sunday.

In the above examples, dynamic sharding has been described based on a table being the atomic granule. In some embodiments, a smaller atomic granule can be defined, for example, a hand of poker or a game play round. In such a case, players may be reseated at a different table after completion of a hand of poker or a round of a game. Not being tied to a table means a game (e.g., of poker) can span geographic regions making the system more available and offering a more fluid ability to spread liquidity across borders.

Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. Other terms are defined throughout the present description.

A "game", as the term is used herein (unless specified otherwise), may generally comprise any game (e.g., wagering or non-wagering, electronically playable over a network) playable by one or more players in accordance with specified rules. A game may be playable on a Personal Computer (PC) online in web browsers, on a game console and/or on a mobile device such as a smart-phone or tablet computer. "Gaming" thus generally refers to play of a game.

A "casual game", as the term is used herein (unless specified otherwise), may generally comprise a game with simple rules with little or no time commitment on the time of a player to play. A casual game may feature, for example, very simple game play such as a puzzle or Scrabbler™ game, may allow for short bursts of play (e.g., during work breaks), an ability to quickly reach a final stage and/or continuous play without a need to save the game. In some embodiments, a casual game can be a social network game.

A "social network game", as used herein (unless specified otherwise), generally refers to a type of online game that is played through a social network, and in some embodiments may feature multiplayer and asynchronous game play mechanics. A "social network" may refer to an online service, online community, platform, or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a browser game, but can also be implemented on other platforms such as mobile devices.

A "wagering game", as the term is used herein (unless specified otherwise), may generally comprise a game on which a player can risk a wager or other consideration, such as, but not limited to: slot games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. "Gambling" or "wagering" generally refers to play of a wagering game.

The term "game provider", as used herein (unless specified otherwise), generally refers to an entity or system of components which provides games for play and facilitates play of such game by use of a network such as the Internet or a proprietary or closed networks (e.g., an intranet or wide area network). For example, a game provider may operate a website which provides games in a digital format over the Internet. In some embodiments in which a game comprising a wagering game is provided, a game provider may operate a gambling website over which wagers are accepted and results of wagering games are provided.

As utilized herein, the term "player" may generally refer to any type, quantity, and or manner of entity associated with the play of a game. In some embodiments, a player may comprise an entity conducting play of an online game, for example, may comprise an entity that desires to play a game (e.g., an entity registered and/or scheduled to play and/or an entity having expressed interest in the play of the game—e.g., a spectator) and/or may comprise an entity that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise an individual (or group) that enters, joins, logs into, registers for, and/or otherwise access an online game room, session, server, and/or other particular instance and/or segmentation of an online game.

Some embodiments described herein are associated with a "player device" or a "network device". As used herein, a "player device" is a subset of a "network device". The "network device", for example, may generally refer to any device that can communicate via a network, while the "player device" may comprise a network device that is owned and/or operated by or otherwise associated with a player. Examples of player and/or network devices may include, but are not limited to: a Personal Computer (PC), a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

As used herein, the term "network component" may refer to a player or network device, or a component, piece, portion, or combination of player or network devices. Examples of network components may include a Static Random Access Memory (SRAM) device or module, a network processor, and a network communication path, connection, port, or cable.

In addition, some embodiments are associated with a "network" or a "communication network." As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication", as used herein (unless specified otherwise), may generally refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

A "session", as the term is used herein (unless indicated otherwise), may generally comprise a period of time spanning a plurality of event instances or turns of the game, the session having a defined start and defined end. An event instance or turn is triggered upon an initiation of, or request for, at least one result of the game by a player, such as an actuation of a "start" or "spin" mechanism, which initiation causes an outcome to be determined or generated (e.g., a random number generator is contacted or communicated with to identify, generate or determine a random number to be used to determine a result for the event instance).

As used herein, the terms "outcome" and "result" should be differentiated in the present description in that an "outcome" is generally a representation of a "result", typically comprising one or more game elements or game symbols. For example, in a "fruit themed" game, a winning outcome (i.e., an outcome corresponding to some kind of award, prize or payout) may comprise a combination of three "cherry" symbols. The "result" of this outcome may be a payout of X credits awarded to the player associated with the game. In another example, in a game in which a character moves along a game interface from a starting position to a finish position, an "outcome" of the game may comprise a symbol representing one or more movements along the interface and the "result" corresponding to this outcome may be the particular number and direction of the character's movement (e.g., three (3) spaces backwards such that the character ends up further away from the finish line). In a session embodiment, a session result may comprise a binary result (e.g., a player or game character wins or loses the session) and/or the particular award (or magnitude of award) won or earned by the player based on the session (e.g., the number of credits awarded to the player). It should be noted that the embodiments described herein encompass awards, prizes and payouts which are monetary, non-monetary, tangible or intangible.

As used herein, the term "virtual currency" may generally refer to an in-game currency that may be used as part of a game or one or more games provided by a game provider as (i) currency for making wagers, and/or (ii) to purchase or access various in-game items, features or powers.

A "credit balance", as the term is used herein (unless indicated otherwise), may generally refer to (i) a balance of currency, whether virtual currency and/or real currency, usable for making wagers in a game and/or (ii) another tracking mechanism for tracking a player's success or advancement in a game by deducting there from points or value for unsuccessful attempts at advancement and adding thereto points or value for successful attempts at advancement.

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable here. In some embodiments, one or more specialized machines such as a computerized processing device, a server, a remote terminal, and/or a customer device may implement the various practices described herein. A computer system of an gaming entity may, for example, comprise various specialized computers that interact to provide for online games as described herein.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

Systems

Turning first to FIG. 1, a block diagram of a system 100 according to some embodiments is shown. In some embodiments, the system 100 may comprise a gaming platform such as a gaming platform via which one or more multiplayer and/or online games may be played. In some embodiments, the system 100 may comprise a plurality of player devices 102a-n in communication with and/or via a network 104. In some embodiments, a game server 110 may be in communication with the network 104 and/or one or more of the player devices 102a-n. In some embodiments, the game server 110 (and/or the player devices 102a-n) may be in communication with a database 140. The database 140 may store, for example, game date (e.g., processed and/or defined by the game server 110), data associated with players (not explicitly shown) owning and/or operating the player devices 102a-n, and/or instructions that cause various devices (e.g., the game server 110 and/or the player devices 102a-n) to operate in accordance with embodiments described herein.

According to some embodiments, any or all of the components 102a-n, 104, 110, 140 of the system 100 may be similar in configuration and/or functionality to any similarly named and/or numbered components described herein. Fewer or more components 102a-n, 104, 110, 140 (and/or portions thereof) and/or various configurations of the components 102a-n, 104, 110, 140 may be included in the system 100 without deviating from the scope of embodiments described herein. While multiple instances of some components 102a-n are depicted and while single instances of other components 104, 110, 140 are depicted, for example, any component 102a-n, 104, 110, 140 depicted in the system 100 may comprise a single device, a combination of devices and/or components 102a-n, 104, 110, 140, and/or a plurality of devices, as is or becomes desirable and/or practicable. Similarly, in some embodiments, one or more of the various components 102a-n, 104, 110, 140 may not be needed and/or desired in the system 100.

The player devices 102a-n, in some embodiments, may comprise any type or configuration of electronic, mobile electronic, and or other network and/or communication devices (or combinations thereof) that are or become known or practicable. A first player device 102a may, for example, comprise one or more PC devices, computer workstations (e.g., game consoles and/or gaming computers), tablet computers, such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, one or more of the player devices 102a-n may be specifically utilized and/or configured (e.g., via specially-programmed and/or stored instructions such as may define or comprise a software application) to communicate with the game server 110 (e.g., via the network 104).

The network 104 may, according to some embodiments, comprise a LAN, WAN, cellular telephone network, Bluetooth® network, NFC network, and/or RF network with communication links between the player devices 102a-n, the game server 110, and/or the database 140. In some embodiments, the network 104 may comprise direct communications links between any or all of the components 102a-n, 110, 140 of the system 100. The game server 110 may, for example, be directly interfaced or connected to the database 140 via one or more wires, cables, wireless links, and/or other network components, such network components (e.g., communication links) comprising portions of the network 104. In some embodiments, the network 104 may comprise one or many other links or network components other than those depicted in FIG. 1. A second player device 102b may, for example, be connected to the game server 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 110, 140 of the system 100. The network 104 may comprise one or more cellular telephone networks with communication links between the player devices 102a-n and the game server 110, for example, and/or may comprise the Internet, with communication links between the player devices 102a-n and the database 140, for example.

According to some embodiments, the game server 110 may comprise a device (and/or system) owned and/or operated by or on behalf of or for the benefit of a gaming entity (not explicitly shown). The gaming entity may utilize player and/or game information or instructions (e.g., stored by the database 140), in some embodiments, to host, manage, analyze, design, define, price, conduct, and/or otherwise provide (or cause to be provided) one or more games such as online multiplayer games. In some embodiments, the gaming entity (and/or a third-party; not explicitly shown) may provide an interface (not shown in FIG. 1) to and/or via the player devices 102a-n. The interface may be configured, according to some embodiments, to allow and/or facilitate electronic game play by one or more players. In some embodiments, the system 100 (and/or interface provided by the game server 110) may present game data (e.g., from the database 140) in such a manner that allows players to participate in one or more online games (singularly, in/with groups, and/or otherwise). According to some embodiments, the game server 110 may provide benefits to players based on player referrals and/or based on groups of players that play together in an online multiplayer game.

In some embodiments, the database 140 may comprise any type, configuration, and/or quantity of data storage devices that are or become known or practicable. The database 140 may, for example, comprise an array of optical and/or solid-state hard drives configured to store player and/or game data, and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the player devices 102a-n may comprise the database 140 or a portion thereof, for example, and/or the game server 110 may comprise the database 140 or a portion thereof.

Figure 2:
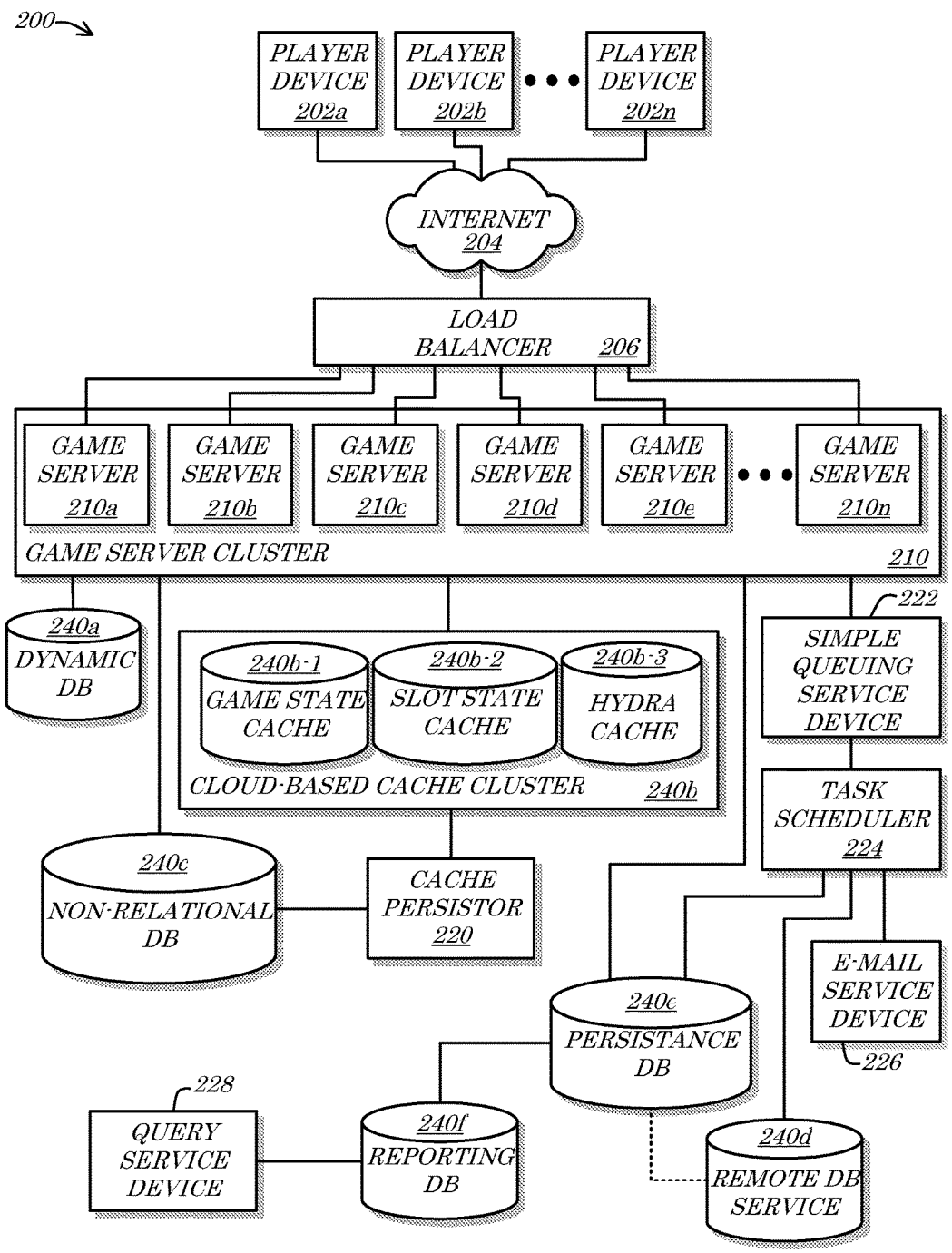
FIG. 2 is a schematic diagram of an embodiment of a distributed computing platform in accordance with one or more embodiments described herein.

Referring now to FIG. 2, a block diagram of a system 200 according to some embodiments is shown. In some embodiments, the system 200 may comprise a gaming platform such as a platform via which social, multiplayer, and/or online games may be played. In some embodiments, the system 200 may comprise a plurality of player devices 202a-n, the Internet 204, a load balancer 206, and/or a game server cluster 210. The game server cluster 210 may, in some embodiments, comprise a plurality of game servers 210a-n. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202a-n, 204, 206, 210a-n, 220, 222, 224, 226, 228 may be in communication with and/or coupled to one or more databases 240a-f. The system 200 may comprise, for example, a dynamic DataBase (DB) 240a, a cloud-based cache cluster 240b (e.g., comprising a game state cache 240b-1, a slot state cache 240b-2, and/or a "hydra" cache 240b-3), a non-relational DB 240c, a remote DB service 240d, a persistence DB 240e, and/or a reporting DB 240f.

According to some embodiments, any or all of the components 202a-n, 204, 206, 210a-n, 220, 222, 224, 226, 228, 240a-f of the system 200 may be similar in configuration and/or functionality to any similarly named and/or numbered components described herein. Fewer or more components 202a-n, 204, 206, 210a-n, 220, 222, 224, 226, 228, 240a-f (and/or portions thereof) and/or various configurations of the components 202a-n, 204, 206, 210a-n, 220, 222, 224, 226, 228, 240a-f may be included in the system 200 without deviating from the scope of embodiments described herein. While multiple instances of some components 202a-n, 210a-n, 240a-f are depicted and while single instances of other components 204, 206, 220, 222, 224, 226, 228 are depicted, for example, any component 202a-n, 204, 206, 210a-n, 220, 222, 224, 226, 228, 240a-f depicted in the system 200 may comprise a single device, a combination of devices and/or components 202a-n, 204, 206, 210a-n, 220, 222, 224, 226, 228, 240a-f, and/or a plurality of devices, as is or becomes desirable and/or practicable. Similarly, in some embodiments, one or more of the various components 202a-n, 204, 206, 210a-n, 220, 222, 224, 226, 228, 240a-f may not be needed and/or desired in the system 200.

According to some embodiments, the player devices 202a-n may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online bingo, slots, poker, and/or other games of chance, skill, and/or combinations thereof. In some embodiments, the various game servers 210a-n (virtual and/or physical) of the game server cluster 210 may be configured to provide, manage, host, and/or conduct individual instances and/or sessions of available game types. A first game server 210a, for example, may host a first particular session of an online bingo game (or tournament), a second game server 210c may host a second particular session of an online bingo game (or tournament), a third game server 210c may facilitate an online poker tournament (e.g., and a corresponding plurality of game sessions that comprise the tournament), and/or a fourth game server 210d may provide an online slots game (e.g., by hosting one or more slot game sessions).

In some embodiments, the player devices 202a-n may comprise various components (hardware, firmware, and/or software; not explicitly shown) that facilitate game play and/or interaction with the game server cluster 210. The player device 202a-n may, for example, comprise a gaming client such as a software application programmed in Adobe® Flash® and/or HTML 5 that is configured to send requests to, and receive responses from, one or more of the game servers 210a-n of the game server cluster 210. In some embodiments, such an application operating on and/or via the player devices 202a-n may be configured in Model-View-Controller (MVC) architecture with a communication manager layer responsible for managing the requests to/responses from the game server cluster 210. In some embodiments, one or more of the game servers 210a-n may also or alternatively be configured in a MVC architecture with a communication manager and/or communications management layer (not explicitly shown in FIG. 2). In some embodiments, communications between the player devices 202a-n and the game server cluster 210 may be conducted in accordance with the HyperText Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202a-n and the game server cluster 210 may be managed and/or facilitated by the load balancer 206. The load balancer 206 may, for example, route communications from player devices 202a-n to one or more of the specific game servers 210a-n depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/"stickiness"). In some embodiments, the load balancer 206 may comprise one or more devices and/or services provided by a third-party (not separately shown in FIG. 2). The load balancer 206 may, for example, comprise an Elastic Load Balancer (ELB) service provided by Amazon® Web Services, LLC of Seattle, Wash. According to some embodiments, such as in the case that the load balancer 206 comprises the ELB or a similar service, the load balancer 206 may manage, set, determine, define, and/or otherwise influence the number of game servers 210a-n within the game server cluster 210. In the case that traffic and/or requests from the player devices 202a-n only require the first and second game servers 210a-b, for example, all other game servers 210c-n may be taken off-line, may not be initiated and/or called, and/or may otherwise not be required and/or utilized in the system 200. As demand increases (and/or if performance, security, and/or other issues cause one or more of the first and second game servers 210a-b to experience detrimental issues), the load balancer 206 may call and/or bring online one or more of the other game servers 210c-n depicted in FIG. 2. In the case that each game server 210a-n comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202a-n and the game server cluster 210 are conducted and/or routed. Such proxy servers and/or devices may comprise one or more regional game hosting centers, for example, which may be geographically dispersed and addressable by player devices 202a-n in a given geographic proximity. In some embodiments, the proxy servers and/or devices may be located in one or more geographic areas and/or jurisdictions while the game server cluster 210 (and/or certain game servers 210a-n and/or groups of game servers 210a-n thereof) is located in a separate and/or remote geographic area and/or jurisdiction.

According to some embodiments, for specific game types such as bingo, the game server cluster 210 may provide game results (such as a full set of drawn bingo numbers and/or bonus metrics) to a controller device (not separately shown in FIG. 2) that times the release of game result information to the player devices 202a-n such as by utilizing a broadcaster device (also not separately shown in FIG. 2) that transmits the time-released game results to the player devices 202a-n (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 210 (and/or one or more of the game servers 210a-n thereof) may be in communication with the dynamic DB 240a. According to some embodiments, the dynamic DB 240a may comprise a dynamically-scalable database service such as the DyanmoDB™ service provided by Amazon® Web Services, LLC. The dynamic DB 240a may, for example, store information specific to one or more certain game types (e.g., slots) provided by the game server cluster 210 such as to allow, permit, and/or facilitate reporting and/or analysis of such information.

According to some embodiments, the game server cluster 210 (and/or one or more of the game servers 210a-n thereof) may be in communication with the cloud-based cache cluster 240b. Game state information from the game server cluster 210 may be stored in the game state cache 240b-1, for example, slot state (e.g., slot-game specific state) data may be stored in the slot state cache 240b-2, and/or other game and/or player information (e.g., progressive data, referral data, player rankings, audit data) may be stored in the hydra cache 240b-3. In some embodiments, the cache persistor 220 may move and/or copy data stored in the cloud-based cache cluster 240b to the non-relational DB 240c. The non-relational DB 240c may, for example, comprise a SimpleDB™ service provided by Amazon® Web Services, LLC. According to some embodiments, the game server cluster 210 may generally access the cloud-based cache cluster 240b as-needed to store and/or retrieve game-related information. The data stored in the cloud-based cache cluster 240b may generally comprise a subset of the newest or freshest data, while the cache persistior 220 may archive and/or store or move such data to the non-relational DB 240c as it ages and/or becomes less relevant (e.g., once a player logs-off, once a game session and/or tournament ends). The game server cluster 210 may, in accordance with some embodiments, have access to the non-relational DB 240c as-needed and/or desired. The game servers 210a-n may, for example, be initialized with data from the non-relational DB 240c and/or may store and/or retrieve low frequency and/or low priority data via the non-relational DB 240c.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide mini-game and/or tournament information to the server cluster 210. According to some embodiments, the task scheduler 224 may initiate communications with the SQS device 222, the e-mail service provider 226 (e.g., providing e-mail lists), the remote DB service 240d (e.g., providing inserts and/or updates), and/or the persistence DB 240e (e.g., providing and/or updating game, player, and/or other reporting data), e.g., in accordance with one or more schedules.

According to some embodiments, the persistence DB 240e may comprise a data store of live environment game and/or player data. The game server cluster 210 and/or the task scheduler 224 or SQS device 222 may, for example, store game and/or player data to the persistence DB 240e and/or may pull and/or retrieve data from the persistence DB 240e, as-needed and/or desired. The server cluster 210 may, according to some embodiments, provide and/or retrieve spin and/or other game event info and/or configuration information via the persistence DB 240e.

In some embodiments, the reporting DB 240f may be created and/or populated based on the persistence DB 240e. On a scheduled and/or other basis, for example, a data transformation and/or mapping program may be utilized to pull data from the live environment (e.g., the persistence DB 240e) into the reporting DB 240f. The query service 228 may then be utilized, for example, to query the reporting DB 240f, without taxing the live environment and/or production system directly accessible by the game server cluster 210.

Figure 3:
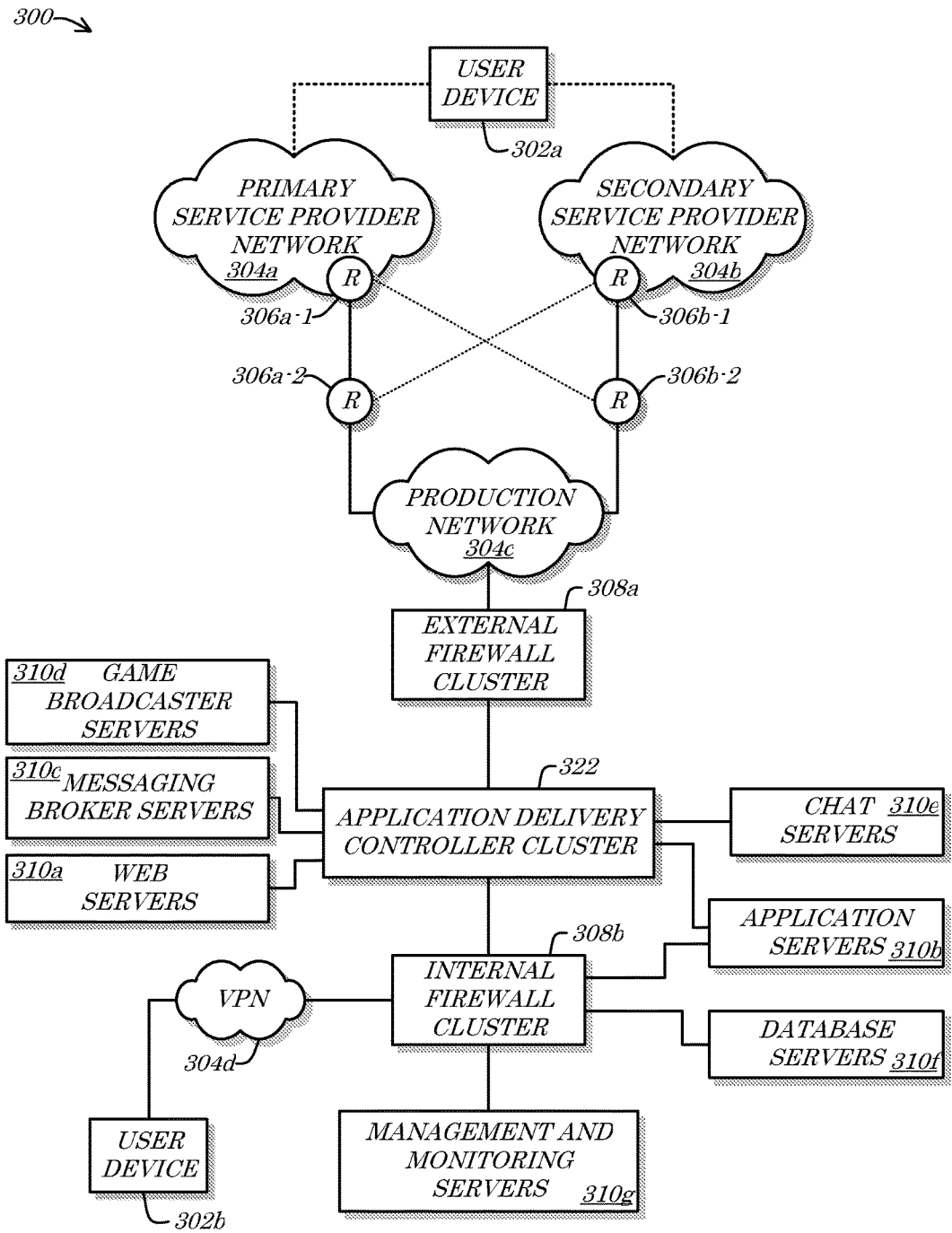
FIG. 3 is a block diagram of an embodiment of a computing device useful in a system according to one or more embodiments described herein.

Turning now to FIG. 3, a block diagram of a system 300 according to some embodiments is shown. In some embodiments, the system 300 may comprise and/or define a "front-end" architecture of a gaming platform such as a platform via which social, multiplayer, and/or online games may be played. In some embodiments, the system 300 may comprise a plurality of user devices 302a-b, a plurality of networks 304a-b (e.g., a primary service provider network 304a, a secondary service provider network 304b, a production network 304c, and/or a VPN 304d), a plurality of routers 306a-b, a plurality of firewall devices 308a-b, a plurality of game servers 310a-g (e.g., web servers 310a, application servers 310b, messaging broker servers 310c, game broadcaster servers 310d, chat servers 310e, database servers 310f, and/or management and monitoring servers 310g), and/or an application delivery controller cluster 322.

According to some embodiments, any or all of the components 302a-b, 304a-b, 306a-b, 308a-b, 310a-g, 322 of the system 300 may be similar in configuration and/or functionality to any similarly named and/or numbered components described herein. Fewer or more components 302a-b, 304a-b, 306a-b, 308a-b, 310a-g, 322 (and/or portions thereof) and/or various configurations of the components 302a-b, 304a-b, 306a-b, 308a-b, 310a-g, 322 may be included in the system 300 without deviating from the scope of embodiments described herein. While multiple instances of some components 302a-b, 304a-b, 306a-b, 308a-b, 310a-g are depicted and while single instances of other components 322 are depicted, for example, any component 302a-b, 304a-b, 306a-b, 308a-b, 310a-g, 322 depicted in the system 300 may comprise a single device, a combination of devices and/or components 302a-b, 304a-b, 306a-b, 308a-b, 310a-g, 322, and/or a plurality of devices, as is or becomes desirable and/or practicable. Similarly, in some embodiments, one or more of the various components 302a-b, 304a-b, 306a-b, 308a-b, 310a-g, 322 may not be needed and/or desired in the system 300.

In some embodiments, a first user device 304a may comprise an electronic device owned and/or operated by a player of an online game (not explicitly shown) and/or by an entity that otherwise accesses online game content and/or services externally (e.g., requiring external login and/or access credentials and/or procedures). The first user device 304a may, for example, be utilized to access content provided by and/or via the application delivery controller cluster 322. In some embodiments, the first user device 304a may interface with and/or connect to the production network 304c via the primary service provider network 304a and/or the secondary service provider network 304b. The primary service provider network 304a and the secondary service provider network 304b may, for example, load balance and/or provide redundant coverage for outage recovery by utilization of a first primary service provider network router 306a-1, a second primary service provider network router 306a-2, a first secondary service provider network router 306b-1, and/or a second secondary service provider network router 306b-2.

According to some embodiments, the application delivery controller cluster 322 may be insulated and/or protected from the production network 304c by an external firewall cluster 308a. The first user device 304a may, for example, be required to provide credentials to and/or otherwise access the application delivery controller cluster 322 via the external firewall cluster 308a.

In some embodiments, the application delivery controller cluster 322 may receive via and/or from the external firewall cluster 308a and/or the production network 304c, one or more requests, calls, transmissions, and/or commands from the first user device 304a. The first user device 304a may, for example, submit a call for an online gaming interface to the application delivery controller cluster 322. In some embodiments, the application delivery controller cluster 322 may comprise one or more hardware, software, and/or firmware devices and/or modules configured (e.g., specially-programmed) to route events and/or responses between the first user device 304a and one or more of the servers 310a-g. In the case that the first user device 304a is utilized to access an online gaming interface for example, one or more of the web servers 310a (e.g., that may provide graphical and/or rendering elements for an interface and/or other web services) and/or the application servers 310b (e.g., that may provide rule and/or logic-based programming routines, elements, and/or functions—e.g., game play engines) may be called and/or managed by the application delivery controller cluster 322.

In some embodiments, the messaging broker servers 310c may receive and/or retrieve messages from the first user device 304a (and/or from one or more of the other servers 310a-b, 310d-g) and perform one or more inter-application processes in relation thereto. The messaging broker servers 310c may, for example, route, transform, consolidate, aggregate, store, augment, and/or otherwise process one or more requests in connection with provision of online gaming services to the first user device 304a (e.g., facilitating a decoupling of services provided by various applications on and/or from the various servers 310a-b, 310d-g). According to some embodiments, the game broadcaster servers 310d may provide scheduled releases of information descriptive of an online game. The game broadcaster servers 310d may, for example, provide a broadcast feed of bingo numbers, slot and/or other random (and/or pseudo-random) number results that may be accessed by (and/or transmitted to) the first user device 304a (e.g., in connection with the play of an online bingo, slots, and/or other game for which broadcast information may be utilized). In some embodiments, the chat servers 310e may provide, manage, and/or facilitate communications between the first user device 304a (and/or first user thereof) and one or more other player/user devices (such as a second user device 302b and/or other player/user devices not shown in FIG. 3).

According to some embodiments, the second user device 304b may generally comprise an electronic device owned and/or operated by a user (not shown) closely affiliated with an entity that operates the system 300 (such entity also not shown). An employee (e.g., programmer and/or Customer Service Representative (CSR)), contractor, and/or other agent of an online gaming company may, for example, utilize the second user device 304b to interface with the privately-accessible VPN 304d. The VPN 304d may, for example, provide direct access to the application servers 310b, the database servers 310f, the management and monitoring servers 310g, and/or the application delivery controller cluster 322. In some embodiments (as depicted in FIG. 3), such access may be gated through and/or insulated or protected by an internal firewall cluster 308b. The second user device 304b may, for example, be required to provide credentials to and/or otherwise access the application delivery controller cluster 322 and/or servers 310a-g via the internal firewall cluster 308b.

In some embodiments, the database servers 310f may provide access to one or more databases and/or data stores (e.g., not shown in FIG. 3; for data storage and/or retrieval). In some embodiments, the management and monitoring servers 310g may provide services such as monitoring, reporting, troubleshooting, analysis, configuring, etc. to the second user device 304b. The second user device 304b may, for example, access the management and monitoring servers 310g and/or the database servers 310f to run reports descriptive of online gaming operations, game play, and/or game referral setup, management, and/or analysis. According to some embodiments, either or both of the user devices 304a-b in conjunction with one or more of the servers 310a-g and/or the application delivery controller cluster 322 may conduct (in whole or in part), facilitate, and/or otherwise be associated with execution of one or more stored procedures, applications, processes, and/or methods (e.g., the methods described herein below, and/or a portion thereof).

Utilization of the term "server" with respect to the servers 310a-g of the system 300 of FIG. 3 is meant solely to ease description of the configuration and/or functionality of the servers 310a-g. The term "server" is not intended to be limiting with respect to any particular hardware, software, firmware, and/or quantities thereof utilized to implement any or all of the servers 310a-g of the system 300. Similarly, while multiple types and/or instances of the severs 310a-g are depicted in FIG. 3, any or all of the servers 310a-g may be implemented in, on, and/or by one or multiple computer server(s) and/or other electronic devices.

Figure 4:
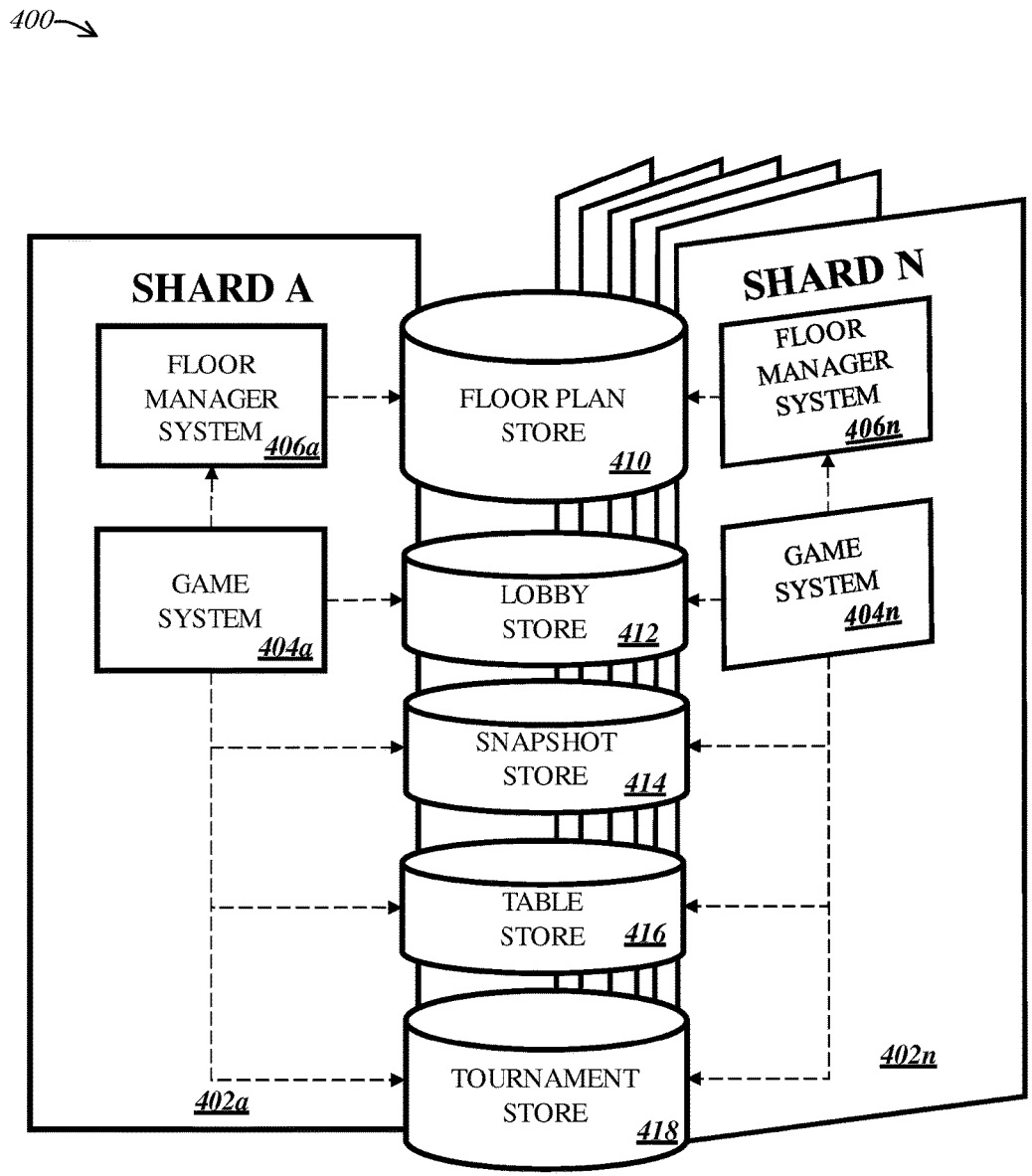
FIG. 4 is a schematic diagram of an example gaming system partitioned into two shards in accordance with one or more embodiments described herein.

Referring now to FIG. 4, an example of a system 400 in accordance with some embodiments of the present invention is represented schematically in a block diagram. The system 400 can include, for example, one or more shards (e.g., representing one or more floors) 402a-n (e.g., each shard 402a-n including a respective game (e.g., poker) system 404a-n and/or a floor manager system 406a-n). The system 400 can also include a number of shared data stores. For example, the system 400 can include a floor plan store 410, a lobby store 412, a snapshot store 414, a table store 416, and/or a tournament store 418. In some embodiments, the table store 416 is adapted to hold data representative of tables including table state information. Likewise, the tournament store 418 is adapted to hold data representative of tournaments including tournament state information. As discussed above, the floor plan store 410 can be adapted to hold a Floor Plan that tracks which tables are on which floor and other floor plan state information. The lobby store 412 can be adapted to hold data used to present players with a choice of tables at which to play and other lobby state information.

In some embodiments, the system 400 (as depicted in FIG. 4) can share the data stores (e.g., the floor plan store 410, the lobby store 412, the snapshot store 414, the table store 416, and/or the tournament store 418) between two or more of the shards 402a-n. In some embodiments, the data stores can be implemented as distributed databases with shared portions stored at one or more data centers corresponding to the locations of the shards. To provide fault tolerance, a shard can include a copy of one or more data store portions of other shards. In other words, in some embodiments, each shard 402a-n can be made aware of the states of the data store portions of other shards, thereby providing failover protection (e.g., whether the shards 402a-n are physically located in the same datacenter or not). In some embodiments, only the table store 416 is shared among the shards 402a-n and alternatively or additionally the floor plan store 410 and/or the lobby store 412 may also or alternatively be shared among the shards 402a-n.

Figure 5:
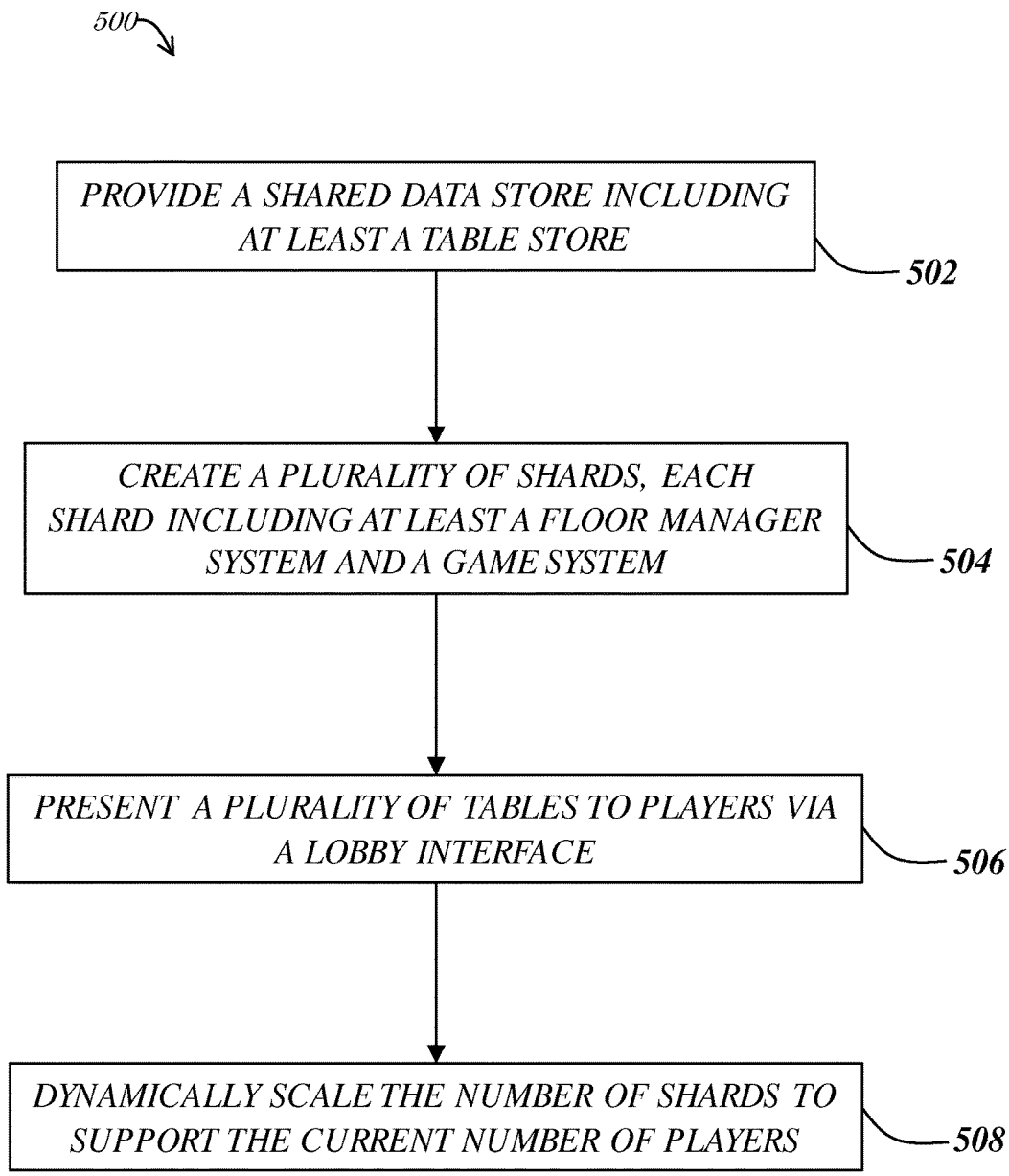
FIG. 5 is a flowchart illustrating a first example method according to one or more embodiments described herein.

Turning now to FIG. 5, a flowchart depicting an example method 500 according to some embodiments of the invention is provided. A shared data store including at least a table store 416 is provided by the system 400 (502). In some embodiments, the shared data store can additionally or alternatively include any combination of a floor plan store 410, a lobby store 412, a snapshot store 414, a table store 416, and/or a tournament store 418. In some embodiments, one or more of the data stores or portions thereof can be shared. A plurality of shards 402a-n that each represent a "floor" of tables and each include an instance of a floor manager system 404a-n and a game (e.g., poker) system 406a-n are created by the system 400 (504). The game systems 406a-n of each shard 402a-n are operatively coupled to the lobby store 412, the snapshot store 414, the table store 416, and/or the tournament store 418 and the corresponding floor manager system 404a-n of the shard 402a-n such that data can be accessed and state information can be written to the respective stores and systems. Likewise, the floor manager system 404a-n of each shard 402a-n is operatively coupled to the floor plan store 410 such that data can be accessed and state information can be written to the floor plan store 410 by the floor manager systems 404a-n. A lobby interface populated with data from the lobby store 412 presents players with a choice of tables at which to play. (506). As players login and out of the system 400 and move between tables, the system 400 is adapted to dynamically scale (e.g., up or down) the number of shards 402a-n provided to host the number of tables required by the demand. (508).

In some embodiments, the system 400 can be adapted to pool players at tables hosted on shards located in data centers in specific geographic areas based upon various factors such as, for example, the geographic location of the players or the preference of the players. In some embodiments, the system 400 can be adapted to provide tournaments where players are allowed to compete against each other even when they are physically located in jurisdictions that do not permit cross-border gaming. This can be achieved by hosting players on shards located within each jurisdiction so that in every case, each player is playing entirely within the jurisdiction in which the player is physically located. In other embodiments, the system 400 can be adapted to provide controlled cross-border gaming restricted to pools formed on shards located within one or more specific geographic area for a specific period of time. Thus, the system 400 is adapted to dynamically create pools of players hosted on shards physically located in selected locations. This flexibility allows the system 400 to operate in compliance with disparate, changing and evolving gaming regulations.

Figure 6:
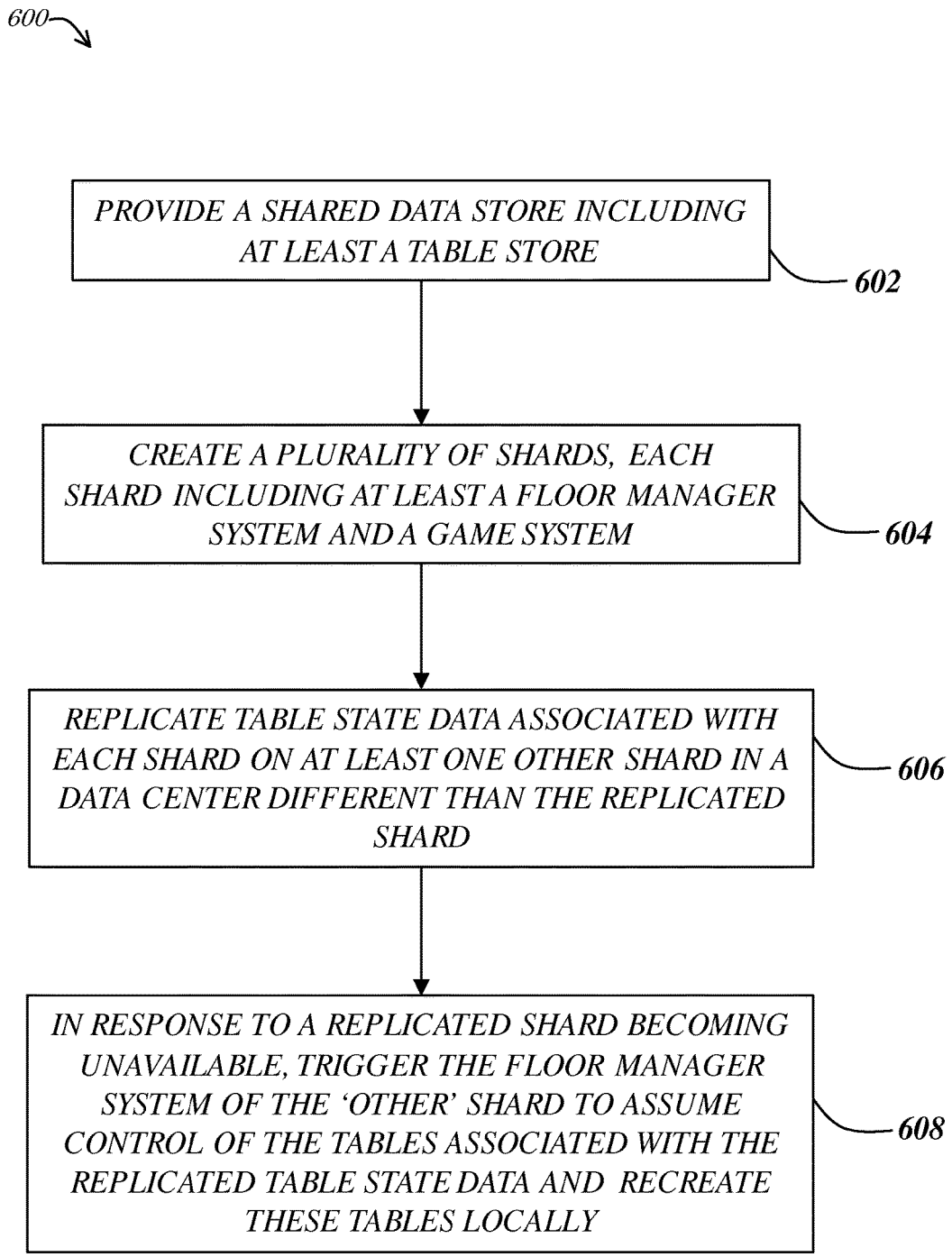
FIG. 6 is a flowchart illustrating a second example method according to one or more embodiments described herein.

Turning to FIG. 6, a flowchart depicting a second example method 600 according to some embodiments of the invention is provided. This method 600 provides a failover solution where a data center housing a shard becomes unavailable or is otherwise removed from the system 400. A shared data store including at least a table store 416 is provided by the system 400 (502). In some embodiments, the shared data store can additionally or alternatively include any combination of a floor plan store 410, a lobby store 412, a snapshot store 414, a table store 416, and/or a tournament store 418. In some embodiments, one or more of the data stores or portions thereof can be shared. A plurality of shards 402a-n that each represent a "floor" of tables and each include an instance of a floor manager system 404a-n and a game (e.g., poker) system 406a-n are created by the system 400 (504). The game systems 406a-n of each shard 402a-n are operatively coupled to the lobby store 412, the snapshot store 414, the table store 416, and/or the tournament store 418 and the corresponding floor manager system 404a-n of the shard 402a-n such that data can be accessed and state information can be written to the respective stores and systems. Likewise, the floor manager system 404a-n of each shard 402a-n is operatively coupled to the floor plan store 410 such that data can be accessed and state information can be written to the floor plan store 410 by the floor manager systems 404a-n. To provide failover protection, table state data associated with each shard is replicated on one or more other shards in data centers that are different than the original source shard. (606) In other words, table state data is backed up into shards in different data centers. Then, if a data center goes offline or otherwise becomes unavailable, and the shard hosted in that data center is removed from the system 400, the floor manager system of the shard storing the replicated table state data of the unavailable shard assumes control of the associate tables and recreates these tables locally. In a system 400 where a Floor Plan is used to allocate tables to floors, the floor manger system of the shard assuming control of the tables also takes control of the portion of the floor plan belonging to the unavailable datacenter/shard.

Rules of Interpretation

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "and/or", when such term is used to modify a list of things or possibilities (such as an enumerated list of possibilities) means that any combination of one or more of the things or possibilities is intended, such that while in some embodiments any single one of the things or possibilities may be sufficient in other embodiments two or more (or even each of) the things or possibilities in the list may be preferred, unless expressly specified otherwise. Thus for example, a list of "a, b and/or c" means that any of the following interpretations would be appropriate: (i) each of "a", "b" and "c"; (ii) "a" and "b"; (iii) "a" and "c"; (iv) "b" and "c"; (v) only "a"; (vi) only "b"; and (vii) only "c."

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component or article is described herein, more than one device, component or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component or article is described herein (whether or not they cooperate), a single device, component or article may alternatively be used in place of the more than one device, component or article that is described. For example, a plurality of computer-based devices may be substituted with a single computer-based device. Accordingly, the various functionality that is described as being possessed by more than one device, component or article may alternatively be possessed by a single device, component or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure may refer to a "control system" or program. A control system or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE INC, John Wiley & Sons, Inc. 2d ed., 1996, which is incorporated by reference in its entirety.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

Accordingly, while the present invention has been disclosed in connection with the preferred embodiments thereof, it should be understood that other embodiments may fall within the spirit and scope of the invention, as defined by the following claims.

What is claimed is:

1. A method for dynamic sharding to provide for location-based player pooling in a regulated wagering game environment, comprising:
   providing, at a first geographic location, a shared data store including at least a table store storing data representative of a table state for each wagering game table of a plurality of wagering game tables, wherein each wagering game table is identified by a unique identifier;
   creating, at each of the first geographic location and a second geographic location, a plurality of shards, wherein each shard includes at least a floor manager system, a database, and a game system, wherein each shard hosts a subset of the wagering game tables of the plurality of wagering game tables, and wherein each database of each shard stores a floor plan that relates each unique wagering game table identifier to the shard on which it is hosted;
   presenting, via a graphical lobby interface and to a plurality of online wagering game players, a plurality of graphical representations of wagering game tables, wherein each graphical representation corresponds to one of the plurality of wagering game tables;
   estimating an expected number of online wagering game players for a future time; and
   scaling, in response to the estimating, a number of the plurality of shards to support the estimated number of online wagering game players.

2. The method of claim 1, wherein a first plurality of shards created at the first geographic location is created on a first virtual machine and wherein a second plurality of shards created at the second geographic location is created on a second virtual machine.

3. The method of claim 1, wherein the first geographic location comprises a first datacenter disposed in a first wagering jurisdiction and wherein the second geographic location comprises a second datacenter disposed in a second wagering jurisdiction.

4. A system configured for use in a regulated wagering game environment comprising:
   a plurality of data centers, each data center including one or more servers operatively coupled to each other data center;
   a shared data store including at least a table store storing data representative of a table state for each wagering game table of a plurality of wagering game tables and distributed among the plurality of data centers; and a plurality of shards wherein each shard includes at least a floor manager system and a game system and wherein the plurality of shards are distributed among the plurality of data centers, wherein the floor manager system is configured to add and remove shards in response to player demand.

5. The system of claim 4 wherein the shared data store further includes a floor plan store adapted to store data representative of tables on floors and floor plan state.

6. The system of claim 4 wherein the shared data store further includes a lobby store adapted to store data representative of lobby state.

7. The system of claim 4 wherein the shared data store further includes one or more distributed databases shared among the plurality of shards.

8. The system of claim 7 wherein the one or more distributed databases shared among the plurality of shards includes replicated portions of the one or more distributed databases on one or more shards.

9. The system of claim 8 wherein the replicated portions of the one or more distributed databases are stored at two or more different data centers.

10. The system of claim 4 wherein the shared data store further includes a tournament store adapted to store data representative of tournament state.

* * * * *